United States Patent [19]

Lorenz et al.

[11] Patent Number: 5,368,796
[45] Date of Patent: Nov. 29, 1994

[54] PROCESS AND APPARATUS FOR REGENERATING USED ARTICLES OF POLYOLEFIN TO REUSABLE RAW MATERIAL

[75] Inventors: Arnulf Lorenz, Dresden; Hans P. Walser, Steinfeld, both of Germany

[73] Assignee: Nordenia Verpackungswerke GmbH, Steinfeld, Germany

[21] Appl. No.: 30,324

[22] PCT Filed: Jun. 26, 1992

[86] PCT No.: PCT/DE92/00492

§ 371 Date: Mar. 4, 1993

§ 102(e) Date: Mar. 4, 1993

[87] PCT Pub. No.: WO93/01036

PCT Pub. Date: Jan. 21, 1993

[30] Foreign Application Priority Data

Jul. 5, 1991 [DE] Germany ............... 4122277

[51] Int. Cl.[5] .............. B29B 17/02; C08J 11/06
[52] U.S. Cl. .............. 214/140; 134/38; 134/61; 241/3; 241/DIG. 38; 264/37; 264/233; 264/DIG. 69; 425/308; 425/DIG. 46
[58] Field of Search ........... 264/37, 233, 122, 140, 264/DIG. 69; 425/DIG. 46, 308; 134/10, 61, 84, 38; 241/3, 60, DIG. 38

[56] References Cited

U.S. PATENT DOCUMENTS

| | | | |
|---|---|---|---|
| 4,073,661 | 2/1978 | Buzga et al. | 264/37 |
| 4,138,534 | 2/1979 | Tedesco | 264/DIG. 69 |
| 4,173,493 | 11/1979 | Kallas . | |
| 4,968,463 | 11/1990 | Lavasseur | 264/DIG. 69 |
| 5,169,588 | 12/1992 | Estepp | 264/DIG. 69 |
| 5,225,130 | 7/1993 | Deiringer | 264/DIG. 69 |
| 5,225,137 | 7/1993 | Sadr | 264/DIG. 69 |
| 5,236,655 | 8/1993 | de Soet | 264/DIG. 69 |

FOREIGN PATENT DOCUMENTS 359106 3/1990 European Pat. Off. .
2155937 10/1985 United Kingdom .

*Primary Examiner*—Mathieu Vargot
*Attorney, Agent, or Firm*—Collard & Roe

[57] ABSTRACT

Used foils made of polyethylene are shredded and, in a solvent bath containing an organic solvent, subjected under intensive motion, for example through mechanical stirring, to a frictional surface cleaning, and simultaneously to an extraction without dissolving the plastic material. By the extraction, ingredients added to the foils and PE waxes are separated from the shreds, and the printing inks are removed especially through the frictional surface cleaning.

17 Claims, 1 Drawing Sheet

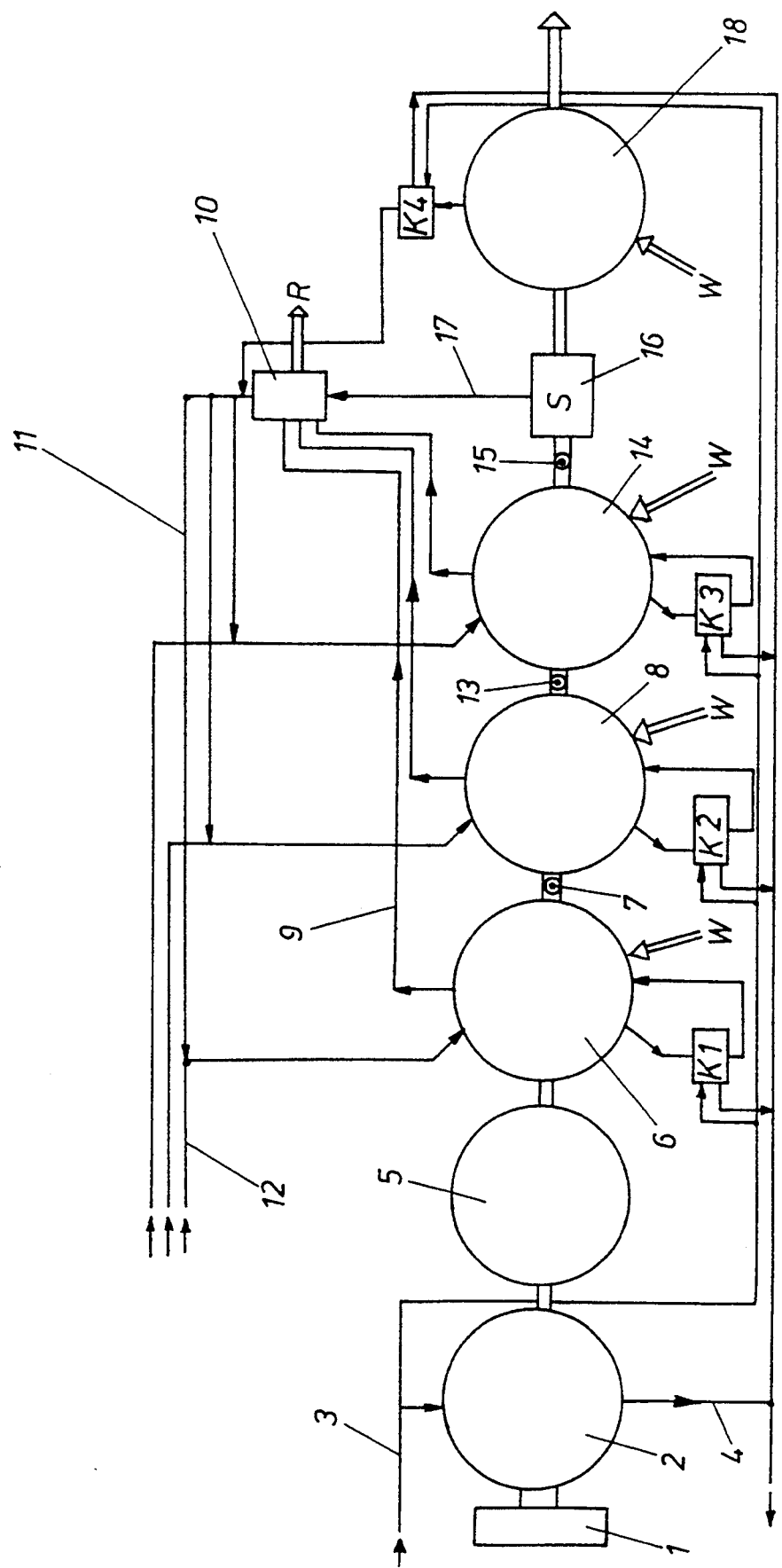

5,368,796

PROCESS AND APPARATUS FOR REGENERATING USED ARTICLES OF POLYOLEFIN TO REUSABLE RAW MATERIAL

BACKGROUND OF THE INVENTION

1. Field of the Invention

The invention relates to a process for regenerating used articles of polyolefin to reusable raw material, in particular for regenerating used packaging foils made of polyethylene such as shrinking foils, bags and the like.

2. The Prior Art

Polyethylene is a polyolefin that is processed in large quantities for the manufacture of foils for packaging purposes. Articles such as, for example shrinking hoods, pouches and the like are manufactured from the foils.

Polyethylene, as a thermoplastic material, is repeatedly fusible and deformable due to its molecular structure. It is suitable for repeated reuse. However, any reprocessing to high-quality recycling products, preferably to PE foils with defined properties, is opposed by the fact that the used articles, in particular foils, are provided during their manufacture in an application-oriented way with additives such as antistatic agents, lubricants and thermo- or UV-stabilizers that are subsequently present in the recycling products manufactured therefrom in unknown quantities and combinations. Sorting of the used articles by ingredients is not possible for technical and economical reasons.

Recycling products, in particular foils loaded with such ingredients lead to problems in the course of their further processing, for example in the course of glueing, fusing or imprinting. Joining seams initially having good properties come apart in many cases only when in the user's hands.

In addition, the used foils contain degradation products such as non-polar PE waxes. The latter develop during the life time in the course of processing processes as well as due to the action of heat, light and weather. Such substances cause to some extent a considerable diminution of the properties of use of the recycling product, i.e., the foil.

Finally, the used foils, in particular packaging foils are imprinted to a greater or lesser extent. During the extrusion of regenerated materials to PE foils, such printing inks lead to a strong undefinable discoloration, so that only darkly dyed refuse bags can be manufactured from such materials.

Therefore, in order to be able to produce again high-quality foils from used polyethylene foil materials, it is necessary to removed from the used foils the foil additives, the non-polar PE waxes as well as the printing inks adhering thereto.

SUMMARY OF THE INVENTION

It is an object of the present invention to provide a process by which used articles, preferably foils, can be regenerated to reusable, high-quality raw material.

According to the invention, the above object is achieved by subjecting the used articles shredded and under intensive motion to an extraction in a solvent bath containing an organic solvent.

The shredding of the foil wastes can be carried out in commonly used shredders. The ingredients are extracted from the shreds during the washing of the latter in an organic solvent, i.e., the ingredients and degradation substances are separated and concentrated in the solvent without any dissolution of the plastic material.

The shreds are intensively moved during their dwelling time in the solvent bath, for example thoroughly stirred mechanically and/or eddied by produced turbulences, for example length- and crosswise currents. In this way, the shreds rub on one another and the printing inks adhering thereto are removed by the high friction. The printing inks so rubbed off are received by the solvent bath. The combination of extraction in the solvent bath and simultaneous intensive motion, for example by mechanical stirring, thus leads to removal of the adhering printing inks as well as separation or extraction of the ingredients and degradation substances from the foil waste. Following a predetermined dwelling time in the solvent bath, during which motion is produced continuously, the shreds thus treated in an advantageous manner in more or less one work step can be melted, shaped to granulate or agglomerate, and reused in the manufacture of high-quality polyethylene products.

Since used packaging foils may also have residues of dirt as well as residues of the goods formerly packaged therein, the shreds are washed in water before they are placed in a solvent bath. Thereafter, the shreds can be dried in a suitable device, for example in a screen centrifuge, in which the water adhering thereto is centrifuged off. The shreds so washed and dried can be subsequently subjected in portions to the treatment in the solvent bath.

The aggressiveness and thus the effect of extraction of the solvent can be increased by maintaining the solvent in the solvent bath at a temperature conforming to its boiling temperature. It is possible in this way to reduce the dwelling time of the shredded foil wastes in the solvent bath. Furthermore, certain ingredients are extracted which are dissolvable in suitable solvents only when acted upon by heat.

Usefully, a solvent is used of which the boiling temperature is significantly below the softening temperature. When using such a solvent, it is avoided during the regeneration that the polyethylene shreds soften to a high degree, or that they melt to a lesser or higher degree and stick to one another. At the same time, printing ink particles are prevented from irreversibly embedding in the polyethylene shreds, which might lead to dyeing of the recycling product, so that the process of the invention would finally not be able to achieve its objective.

Furthermore, advantageously, a solvent is used of which the density is lower than the density of the shreds to be regenerated. In this way, the polyethylene shreds are prevented from floating up. Due to their higher specific weight, the shreds sink downwardly and are in this way subjected more intensively to mutual friction for rubbing off the printing inks adhering thereto.

Moreover, the solvent has to satisfy the condition that it is thermally and chemically stable and thus repeatedly usable over a long operating time, and that it behaves chemically or indifferently vis-a-vis the polyethylene, i.e., that it does not show any reaction with the plastic material.

Solvents of this type that are particularly suitable for application in the process according to the invention are preferably low-boiling acetic acid esters such as methyl acetate, ethyl acetate and isopropyl acetate, or also alcohols such as ethyl alcohol. In this connection, the esters have advantages over ethyl alcohol only with respect to their power of extracting foil ingredients.

It has been found that a dwelling time of the shreds in the solvent under intensive motion, for example caused by continuous stirring, of approximately two hours suffices in order to completely separate adhering printing inks, foil-furnishing substances as well as the non-polar PE waxes with a share of 80%. However, it has been found that the separated printing ink pigments dispersed in the solvent lead to an undesirable recoloration of the polyethylene shreds, as these pigments may accumulate on the surfaces of the foil shreds as well.

For this reason, provision is made according to a useful further embodiment of the process that the shreds, after a predetermined minimized dwelling time in a first solvent bath under boiling heat, are removed and placed in at least one additional solvent bath. Thus the shreds are separated from the solvent that is highly loaded with printing inks and acted upon by fresh solvent. This can be advantageously repeated a number of times.

It is particularly advantageous in connection with the process according to the invention if the dwelling time of the shreds in the solvent baths is equated with the time of a solvent exchange, whereby the solvent exchange takes place at the end of the dwelling time of the shreds in a first bath after about 30 minutes, in the second bath after about 30 minutes, and in a third bath after approximately 30 to 60 minutes.

The solvent vapors liberated during boiling of the solvents in the solvent baths are usefully collected, condensed, and the solvent condensate admitted to reuse in the solvent baths.

In a practical implementation of the process according to the invention, the shreds are washed in water, the washed shreds are dried in particular by centrifuging, and a predetermined quantity of the dried shreds is placed in a first solvent bath containing boiling solvent. In said solvent bath, intensive stirring is carried out mechanically for about 30 minutes; subsequently, the shreds are removed from the first solvent bath and placed in a second solvent bath, and again boiled and thoroughly stirred for 30 minutes. The shreds together with the solvent form a pumpable mass that can be pumped from one solvent bath to a following bath. During the pumping action, an at least partial solvent exchange can take place in the solvent baths simultaneously, for example by adding fresh solvent to the solvent bath from which the shreds are pumped off together with a portion of the used solvent. After the the shreds have been boiled and intensively stirred again for 30 minutes in a second solvent bath, they are placed in a third solvent bath and again boiled and thoroughly stirred for 30 to about 60 minutes. Subsequently, the shreds can be removed from the third solvent bath and then separated from the solvent particularly by squeezing the latter out. The drained shreds are subsequently dried under evaporation of solvent residues still adhering thereto, and thereafter can be melted and made available for their reuse.

Consumed solvents are loaded with separated ingredients, degradation substances as well as solids formed by printing ink residues. By filtrating and distilling the consumed solvents it is possible to separate and subsequently discard as waste the foil additives, PE waxes and printing inks contained in such solvents as residue in the dissolved or undissolved form in a collected order of magnitude of about 1 to 5% by weight.

The closed solvent circulation reduces the solvent consumption to the technically realizable minimum.

Finally, the process according to the invention has the advantage that the recovered recycling product has also been relieved of health-relevant substances and germs that might have contaminated the used starting product.

A device for carrying out the process is characterized by a shredding mechanism for used articles, a shred washing station arranged downstream, at least one downstream solvent bath with integrated agitator, a conveying device for conveying the shreds from the shredder through the solvent baths, condensers for recovering solvent from the solvent off-vapors, as well as a drying device for the treated shreds. The conveying device for conveying the shreds may be a pumping plant conveying the shreds together with a carrier means, for example a fluid carrier means, in particular the solvent itself, through the individual processing stations. In the individual treatment stations, ingredients are extracted from the foil shreds and the printing inks adhering to the latter are rubbed off mechanically by intensive motion, for example stirring. The solvent loaded with the ingredients and printing inks can be admitted to a distilling apparatus separating the extracts and solids. The extracts and solids separated from the solvent in such distilling apparatus can be admitted to a waste elimination system, whereby the regenerated solvent can be recycled into the regeneration process.

An exemplified embodiment, from which additional features of the invention can be derived, is schematically shown in the drawing.

BRIEF DESCRIPTION OF THE DRAWINGS

The drawing shows a process diagram of the operation of the process according to the invention.

BRIEF DESCRIPTION OF PREFERRED EMBODIMENT

Used foils are admitted to a schematically shown shredding mechanism 1 and cut to shreds. The shreds are admitted to a shred washing station 2 and washed there with feed water. The industrial water is fed via the industrial water conduit 3 and discharged again by way of the conduit 4. The washed shreds are removed from the washing station and admitted to a screen centrifuge 5, in which drying takes place. The dried shreds are subsequently transferred to a first solvent bath 6, to which the process heat W is admitted in order to maintain the solvent contained therein, for example ethyl acetate, at the boiling point of about 78° C. An agitator is installed in the first solvent bath 6, said agitator being capable of intensively and thoroughly stirring the shreds in the solvent bath. Liberated solvent vapors can be admitted to the condenser K1, from which the condensed solvent can be fed again in the liquid form to the solvent bath 6. The condenser K1 is operated with cooling water, which is branched off from the industrial water conduit 3. Following a defined dwelling time of the shreds in the first solvent bath 6, for example of 30 minutes, a mash consisting of shreds and solvent is transferred into the second solvent bath 8 by means of the pump 7. At the same time, the solvent present in the solvent bath 6, which solvent is already loaded with extracts and printing inks rubbed off due to the stirring effect, is at least partly admitted to the distilling apparatus 10 via the conduit 9. In said distilling apparatus, the solids are separated from the solvent and the regenerated solvent can be returned via a conduit 11 to the first solvent bath 6, whereby fresh solvent is added, if need be, from a supply tank (not shown in the drawing) via the feed conduit 12. An agitating mechanism (not shown in the drawing) is installed also in the second solvent bath 8, which agitator intensively and thoroughly stirs the shreds admitted to said bath. In the present case too, process heat W is admitted in order to continue the extraction and ink removal process. The second solvent bath 8, too, is equipped with the condenser K2, and coupled via the required conduits with the distilling apparatus 10, which is capable of regenerating the consumed solvent and which releases the precipitated residues R, so that the latter can be admitted to waste elimination.

Following a defined dwelling time of, for example 30 minutes, a mash consisting of shreds and solvents can be transferred by means of the pump 13 from the second solvent bath 8 to a third solvent bath 14, to which process heat W is admitted too, and which is equipped with the condenser K3 and connected with the distilling apparatus 10 by way of the required conduits. Following a dwelling time of 30 to 60 minutes, the shreds together with the portions of solvent adhering thereto are withdrawn via the pump 15 and admitted to a separator 16, which, for example, may be a filter press, and in which the shreds are separated from the solvent. The separated solvent is admitted via the conduit 17 to the distilling apparatus 10 and regenerated there and separated from the residues to be discarded. The shreds that are removable from the separator 16 are admitted to a dryer 18, to which process heat W is admitted as well, in order to remove by evaporation the residues of solvent adhering to said shreds. The vapors are collected, liquefied in the condenser K4, which like the condensers K1, K2 and K3 has water feed and water discharge conduits, and added to the conduits 11 for regenerated solvent, said conduits extending from the distilling apparatus 10.

The shreds removable from the dryer 18 can be melted and processed to granulate, from which high-quality foils can be manufactured again for packaging purposes.

We claim:

1. Process for regenerating used articles of polyolefin to reusable raw material, comprising
    shredding used articles of polyolefin plastic material into shreds;
    placing the shreds in a first solvent bath containing boiling solvent and intensively stirring mechanically for about 30 minutes to rub the shreds on one another and remove the printing inks adhering to the shreds by friction;
    removing the shreds from the first solvent bath which is loaded with printing inks and placing the shreds in a second solvent bath so that the shreds are acted on by fresh solvent, and boiling and intensively stirring again for 30 minutes;
    placing the shreds in a third solvent bath and boiling and intensively stirring for about 30 to 60 minutes;
    removing the shreds from the third solvent bath and dripping off the solvent;
    drying the dripped-off shreds under evaporation of solvent residues adhering thereto; and
    subsequently melting and shaping the shreds into granulate usable as reusable raw material.

2. Process according to claim 1, comprising
    prior to placing the shreds in the first solvent bath, washing the shreds in water and subsequently drying the shreds.

3. Process according to claim 1, comprising
    using as the solvent a liquid of which the boiling point is below the softening temperature of the polyolefin plastic material.

4. Process according to claim 1, comprising
    using as the solvent a liquid of which the density is lower than the density of the polyolefin plastic material.

5. Process according to claim 1, comprising
    using as the solvent a liquid which is thermally and chemically stable in the process and chemically inert to the polyolefin plastic material.

6. Process according to claim 1, comprising
    using as the solvent low-boiling acetic esters.

7. Process according to claim 6, comprising
    using as the solvent low-boiling alcohols.

8. Process according to claim 6, comprising
    using ethyl acetate as the solvent.

9. Process according to claim 7, comprising using ethyl alcohol as the solvent.

10. Process according to claim 1, comprising
    at least partly exchanging the solvent content of the solvent baths for fresh solvent.

11. Process according to claim 10, comprising
    carrying out the exchange of solvent with the removal of the shreds from the solvent baths.

12. Process according to claim 11, comprising
    carrying out the exchange of solvent in the first solvent bath after about 30 minutes, in the second solvent bath after about 30 minutes, and in the third solvent bath after about 30 to 60 minutes.

13. Process according to claim 10, comprising
    collecting and condensing solvent vapors liberated during boiling and returning solvent condensate for reuse to the solvent baths.

14. Process according to claim 1, comprising
    distilling the solvents from a solvent bath loaded with extracts and printing inks to produce a fraction of solids and a separated solvent fraction;
    discarding the fraction of solids obtained thereby as waste; and
    returning the separated solvent fraction to a solvent bath.

15. Apparatus for regenerating used articles of polyolefin to reusable raw material, comprising
    means for shredding used articles of polyolefin plastic material into shreds;
    a first solvent bath container containing boiling solvent and having means for intensively stirring the bath mechanically to rub the shreds on one another and to remove the printing inks adhering to the shreds by friction;
    means for placing the shreds into the first bath container;
    a second solvent bath container containing a boiling solvent and having means for intensively stirring the bath mechanically;
    means for removing the shreds from the first solvent bath container containing printing ink loaded solvent and for placing the shreds in the second bath container so that the shreds are acted on by fresh solvent;
    a third bath container containing a boiling solvent and having means for intensively stirring the bath mechanically;
    means for removing the shreds from the second bath container and for placing the shreds in the third solvent bath container;

a drier for drying the shreds by evaporation of solvent residues adhering thereto;

means for removing the shreds from the third solvent bath container and for transporting the shreds to the drier; and means for melting the shreds and shaping the melt into granulate usable as reusable raw material.

16. Apparatus according to claim 15, further comprising a first condenser for recovering solvent from solvent off-vapors from said first solvent bath container;

a second condenser for recovering solvent from solvent off-vapors from said second solvent bath container; and a third condenser for recovering solvent from solvent off-vapors from said third solvent bath container.

17. Apparatus according to claim 15, further comprising at least one distilling apparatus for separating the printing ink loaded solvent into a solvent fraction and a solid fraction.

* * * * *